Patented Nov. 2, 1926.

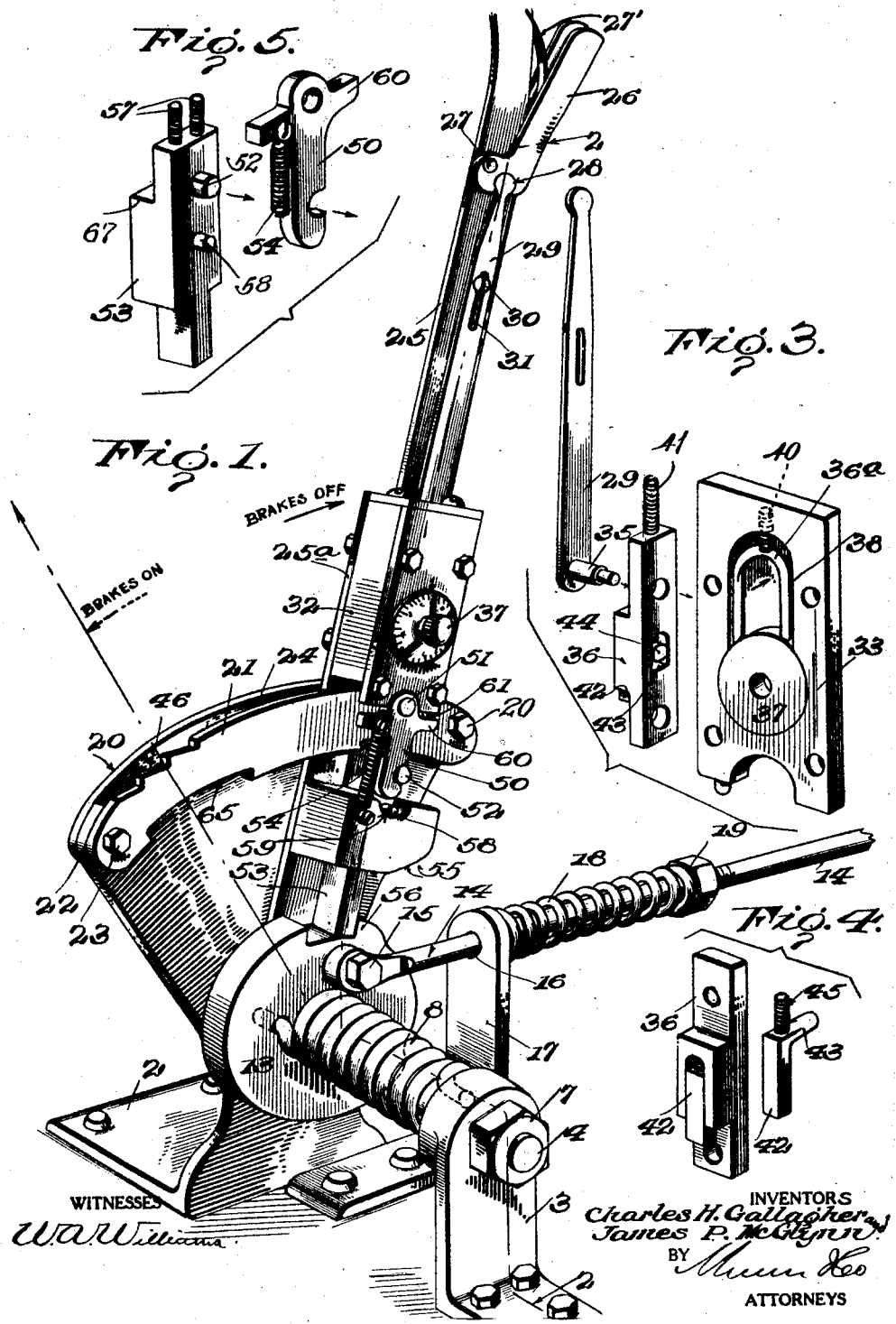

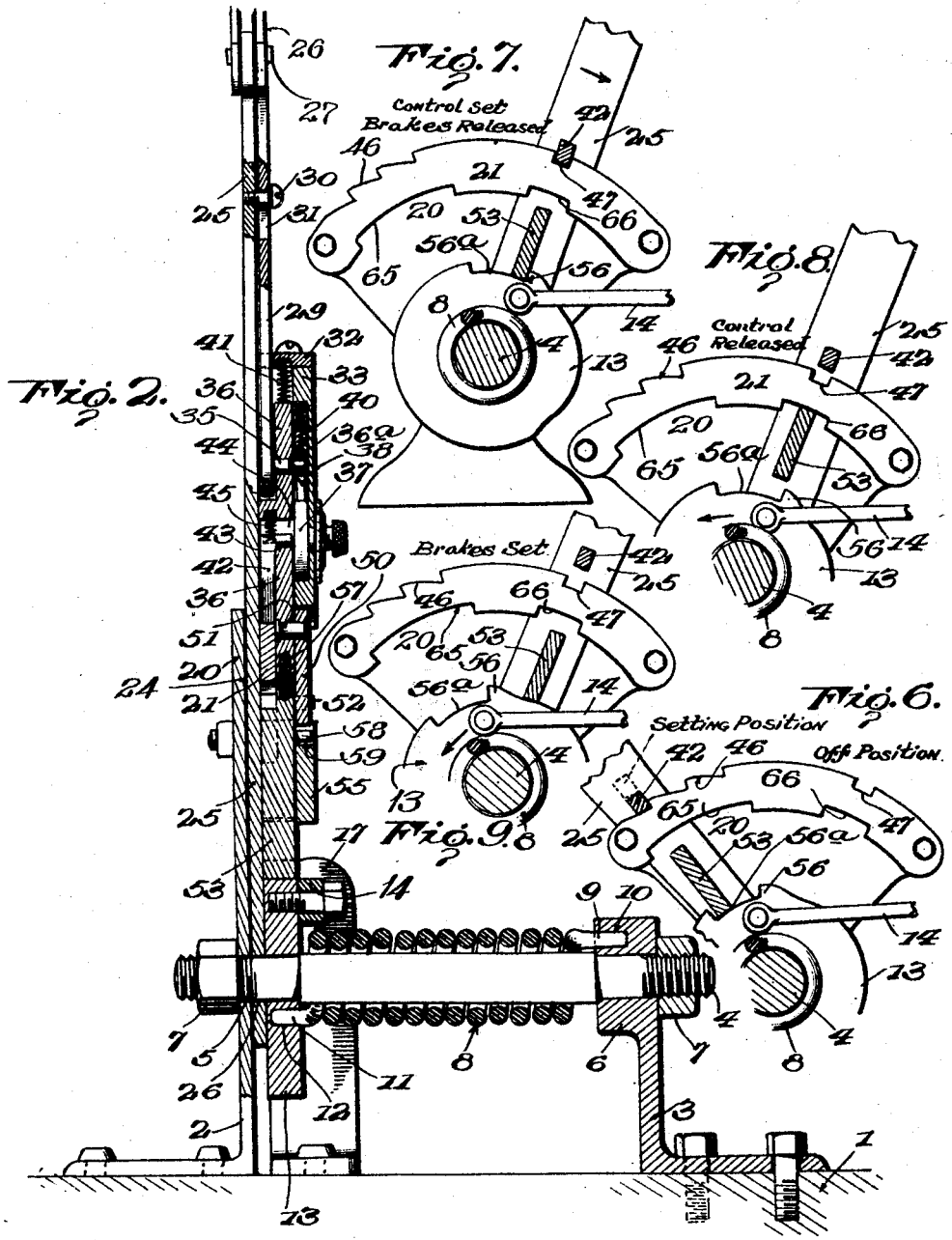

1,605,340

UNITED STATES PATENT OFFICE.

CHARLES H. GALLAGHER AND JAMES P. McGLYNN, OF WILKES-BARRE, PENNSYLVANIA.

AUTOMATIC BRAKE.

Application filed September 25, 1925. Serial No. 58,590.

This invention relates to a quick-acting or automatic brake especially adapted for use on automobiles or the like and which is also designed for use as a lock to prevent theft or operation of an automobile by unauthorized persons.

One of the principal objects of the invention resides in the provision of a brake which may be held in off position wherein it does not tend to retard the vehicle but which may be instantly released so as to permit power means associated therewith to automatically and quickly set the same.

A further object resides in the provision of a brake of this character having a handle or other control means whereby it may be conveniently manipulated and set, the handle or control means being so associated with the braking mechanism that it will not swing with the same when the brake is being automatically set, thereby protecting the driver or passengers in the automobile from danger of injury.

A further object resides in the provision of a device having these advantages and capacities and which is of simple and durable construction, reliable and efficient in operation and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawings forming a part of this specification, and in which:—

Figure 1 is a perspective view showing one embodiment of the invention,

Figure 2 is a view in section on the line 2—2 of Figure 1,

Figure 3 is a group view in perspective showing certain details of the locking means, Figure 4 is a similar view showing the pawl and certain of the parts employed for latching the handle to its quadrant, Figure 5 is a group view in perspective showing the form and its control employed for connecting the handle to the disc of the spring shaft, and Figures 6, 7, 8 and 9 are diagrammatic views illustrating the action of the device.

Referring to the drawings the numeral 1 designates the supporting structure on which brackets 2 and 3 are fixed. A supporting shaft 4 is fixedly secured in bearings 5 and 6 provided on the brackets 2 and 3 and is held against endwise movement by means of nuts 7.

A torsional coil spring 8 is mounted on the shaft 4 between the brackets 2 and 3. One end of the spring 8 is extended parallel to the shaft, as indicated at 9, and such extended end is received in a socket 10 provided therefor in the bearing 6. The opposite end of the spring is similarly extended, as indicated at 11, and the extension 11 is fitted in a socket 12 provided in one face of a controlling disc 13, the controlling disc 13 being loosely mounted on the shaft. The controlling disc is connected by any suitable type of motion transmission mechanism to the braking means (not shown). The braking means may be of any conventional type and forms no part of this invention. For the sake of illustration the disc is shown as connected to one end of an operating rod 14 by means of a crank pin projecting laterally from the disc. The rod 14 is slidably fitted in a bearing 16 provided therefor in the bracket 17. The spring 8 is heavy and is assembled under considerable tension so that this spring tends to urge the brakes to braking position and to hold them in such position.

In order to absorb some of the shock which would otherwise be incident to the quick application of the brakes by the spring 8, a light coil spring 18 may be provided on the rod 14, one end of the coil spring 18 abutting the bracket 17 and the other end being engaged by a collar 19 which may be a nut threaded on the rod 14. The tendency of the spring 18 is to release the brakes, but it is so light that its effect is entirely overbalanced by the spring 8, the only purpose of the spring 18 being to take up the shock in the final phases of the braking application. Of course, the spring 18 may be entirely omitted.

The bracket 2 is extended upwardly and the upper end 20 thereof provides an element of the quadrant, the quadrant also including an arcuate bar 21, the bar 21 being secured in spaced parallel relation to the portion 20 of the bracket 2 by means of spacing blocks 22 and bolts and nuts 23. The bar 21 and portion 20 of the bracket define between them a slot 24 in which an operating and controlling handle 25 is fitted. Adjacent the inner end of the operating and control handle it is formed with an opening 26 in which the shaft 4 is rotatably fitted. In order that the lever 25 may be conveniently manipulated to control and operate the brakes there is provided, adjacent its upper or outer end, with a hand-grip operated lever 26, the lever 26 being pivotally connected, as at 27, to the handle 25 and being biased to one position by means of the spring 27'. One arm of the lever is connected by a ball and socket joint 28 to the upper end of a sliding bar 29, the bar 29 being constrained to slide against the lever by means of a screw 30 connected to the lever 25 and fitted in an elongated slot 31 provided in the bar 29. The bar 29 extends through a lock casing 32 having a front plate 33 riveted or otherwise securely fastened in position to the side members of the lock casing and to a laterally enlarged portion 25$^a$ of the handle 25. The top member of the lock casing is slotted to accommodate the bar 29. The lower end portion of the bar 29 which operates in the lock casing is provided with a lateral projection or pin 35. The pin 35 affords a means whereby the lower end of the bar 29 is pivotally connected to a latch carrier and pawl operating element or bar 36. This pin or projection 35 also co-acts with the shackle 36$^a$ of a permutation or combination lock 37, the lock 37 and shackle 36$^a$ being fitted in an opening 38 provided on the inner face of the front plate 33 of the lock. Of course, the operating knob of the lock is arranged on the outside of the front plate 33 of the lock. The shackle 36$^a$ of the lock is urged to closed position by means of a coil spring 40 engaging the shackle and held in a recess in the front plate 33 above the shackle. The recess 38 constrains the shackle to partake of reciprocatory movement. The element 36 is also urged downwardly by means of a coil spring 41 which engages the top of the lock casing and the top of the element 36 as shown in Fig. 2.

As illustrated in Figure 4 the element 36 is recessed to carry a reciprocable latch 42, the latch 42 having a lateral extension 43 at one end which operates in a slot 44 in the element 36 to limit the movement of the latch 42. A coil spring 45 is provided for urging the latch 42 to position to engage the teeth 46 or the notch 47 of the bar 21 of the quadrant.

The lower end of the element 36 has a hook 50 pivotally connected thereto, as at 51, and this hook 50 is urged into engagement with a pin 52 of a pawl 53 by means of a coil spring 54 connected to the hook and to a stationary guide 55 fixed on the handle 25. The pawl 53 is slidably fitted in this guide 55. The inner end of the pawl 53 is engageable with one or more teeth 56 provided on the disc 13. Preferably only one tooth 56 is provided but, of course the number may be varied as desired. Expansible coil springs 57 are provided between the lower end of the element 36 and the upper end of a pawl 53 for urging the pawl 53 into engagement with the teeth 56. The downward movement of the pawl 53 is limited by means of a stop pin 58 co-operable with a notch 59 on the guide 55. In order to provide for the automatic release of the pawl 53 from the element 36 when such action is desired, the hook 50 is formed with a release lug 60 engageable with an abutment 61 on the lock casing to swing the hook about its pivot 51 to cause its bill to be disengaged from the pin 52 when the hand lever 26 is swung as far as it may be and the bar 29 and the element 36 are lifted up as far as they may be. When the hook 50 is disengaged from the pin 52 the springs 57 will force the pawl 53 down into engagement with the brake disc.

The underside of the bar 21 of the quadrant is formed with a slot 65 and a notch 66 co-operable with the shoulder 67 of the pawl in a manner to be hereinafer more fully described.

In operation, when it is desired to release the brakes and yet have them ready for instant application the outer end of the handle and the hand grip operated lever 26 are grasped and the lever 26 is pulled up against the lever 25 and the lever 25 is then pulled to the right, as viewed in Fig. 1. The movement of the lever 26 from the position shown in Fig. 1, up against the handle 25 raises the bar 29 and the element 36, thereby elevating the latch 42 above the teeth 46 of the quadrant bar 21 since the element 36 has been elevated to a sufficient extent to cause the bottom of its slot 44 to engage the lateral extension 43 of the latch 42 and thereby elevate the latch. This releases the hand lever and makes it possible to swing the same since the latch 42 has been raised from the position shown in full lines in Fig. 6 to the position shown in dotted lines in the same figure. This action has also disconnected the hook 50 from the pin 52 of the pawl 53 and permitted the pawl to snap down into the notch 56$^a$ of the disc 13 wherein this pawl 53 is in position to engage the tooth 56, as illustrated in Figure 6. Now then when the handle 25 is swung to the right, as viewed in Figures 1 and 6 to 9, inclusive, it will carry with it the disc 13 due to the engagement of the pawl 53 which is mounted in the bearing 55 fixed on the handle 25 with the tooth 56. When the handle has been swung to the right, as viewed in these figures as far as it may be, the handle grip lever 26 is released. This permits the latch 42 to drop into the notch 47 of the bar 21 as shown in Fig. 7 but although the hook 50 reengages the pins 52 the position of the pawl 53 and its engagement with the tooth 56 is not disturbed. The brakes are now released but the spring 8 has been tensioned to a high degree and should the pawl 53 be disengaged from the shoulder 56 the spring 8 will immediately operate to set the brakes. It will now be understood that with the handle positioned as shown in Figure 7 and also shown in Figure 1 it is only necessary to exert a light pressure on the lever 26 to instantly apply the brakes for the reason that a slight swinging movement of the lever 26 will raise the bar 29 and element 36 and also the pawl 53 since the hook 50 is now connected with the pin 52. The elevation of the pawl 53 will disconnect it from the tooth 56 and permits the spring 8 to rotate the disc 13 and apply the brakes. As shown in Figure 8 this elevation of the pawl 53 causes its shoulder 67 to engage in the notch 65 and thus preclude the handle 25 from swinging with the disc 13. The advantage of this action is that the handle 25 cannot jerk the arm of the operator or injure persons adjacent thereto as it would be liable to do if it were swung violently with the disc 13.

To reset the brakes it is only necessary to grasp the lever 26 and the handle 25 with the parts disposed as shown in Figure 8 and pull the lever 26 up against the lever 25 to disengage the hook 50 and pin 52, permitting the pawl 53 to ride along the periphery of the disc 13 while retaining the latch 42 above the bar 21. With the parts so positioned the bar 25 is swung around to the left, as shown in Figures 1 and 6 to 9, inclusive, until the handle takes the position shown in Figure 6 when the lever 26 is released and the latch 42 and pawl 53 assume the position as shown in full lines in Figure 6. The purpose of the slot 65 is to arrest the swinging movement of the lever 25 to the right, as viewed in Fig. 1 should the operator when attempting to set the control to release the brake and only partially swing the lever 26 thus not have disengaged the hook 50 and pin 52.

When the lock 37 is locked its shackle 36ª is, of course, held against movement and this shackle 36ª engages the pin 35 to hold this pin against upward movement. The pin 35 is connected with the bar 29 and the element 36 which controls the action of the pawl 42. Consequently the lock serves to hold all of these parts in their lowermost position to which they are urged by the springs 29', 41 and 40. In the lowermost position of these parts the pawl 42 engages the teeth 46 of the bar 21 of the quadrant and, of course, as long as the pawl 42 is engaged with the teeth 46 the handle lever 25 cannot be swung to release the brakes. The lock 37 prevents release of the pawl 42 and thereby locks the brakes on. Of course no one but the owner or other person authorized to drive the car is acquainted with the combination of the lock and in this way theft or unauthorized use of the car is prevented.

We claim:

1. Operating means for brakes including a disc, spring means for urging the disc to position to set the brakes, a handle having a pawl engageable with and disengageable from the disc, a latch and quadrant for holding the handle in adjusted position, and common means for controlling the pawl and latch and quadrant.

2. Operating means for brakes including a disc, spring means for urging the disc to position to set the brakes, a handle having a pawl engageable with and disengageable from the disc, a latch and quadrant for holding the handle in adjusted position, common means for controlling the pawl and latch and quadrant, and a lock for preventing release of the latch.

3. Operating means for brakes including a shaft, a disc loosely mounted on the shaft, spring means for biasing the disc to such position as to set the brakes, a hand lever loosely mounted on the shaft and having a pawl engageable with and disengageable from the disc, a quadrant, a latch co-operable with the quadrant, a combined pawl operating and latch carrying element mounted on the handle, a slidable bar for operating said element, a hand grip actuated lever connected with the bar for sliding the same, and an automatically releasable and engageable connection between the element and the pawl.

4. Operating means for brakes including a shaft, a disc loosely mounted on the shaft, spring means for biasing the disc to such position as to set the brakes, a hand lever loosely mounted on the shaft and having a pawl engageable with and disengageable from the disc, a quadrant, a latch co-operable with the quadrant, a combined pawl operating and latch carrying element mounted on the handle, a slidable bar for operating said element, a hand grip actuated lever connected with the bar for sliding the same, an automatically releasable and engageable connection between the element and the pawl and comprising a hook pivoted to the element and having a bill, a pin connected to the pawl and co-operable with the bill of the hook, a spring urging the hook to position to engage the pin, a lug on the hook, and an abutment connected with the handle and co-operable with the lug.

5. Operating means for brakes including a shaft, a disc loosely mounted on the shaft, spring means for biasing the disc to such position as to set the brakes, a hand lever loosely mounted on the shaft and having a pawl engageable with and disengageable from the disc, a quadrant, a latch co-operable with the quadrant, a combined pawl operating and latch-carrying element mounted on the handle, a slidable bar for operating said element, a hand grip actuated lever connected with the bar for sliding the same, an automatically releasable and engageable connection between the element and the pawl, said quadrant having teeth and notches co-operable with the latch and also having a notch co-operable with the pawl.

6. An operating means for brakes comprising an actuating disc for the brakes, spring means for biasing the disc to such position as to set the brakes, a hand lever having a pawl engageable with and disengageable from the disc for shifting and controlling the same and also having a latch, a quadrant co-operable with the latch of the hand lever, a hand grip operated latch carrier and pawl operating element, a lock casing enclosing said element, a lock mounted in the casing and having a shackle, a lateral projection constrained to partake of the movement of said element and engageable with said shackle, and an automatically releasable and engageable connection between said element and said pawl.

7. An operating means for brakes comprising an actuating disc for the brakes, spring means for biasing the disc to such position as to set the brakes, a hand lever having a pawl engageable with and disengageable from the disc for shifting and controlling the same and also having a latch, a quadrant co-operable with the latch of the hand lever, a hand grip operated latch carrier and pawl operating element, and an automatically releasable and engageable connection between said element and said pawl.

8. An operating means for brakes comprising an actuating disc for the brakes, spring means for biasing the disc to such position to set the brakes, a hand lever having a pawl engageable with and disengageable from the disc for shifting and controlling the same and also having a latch, a quadrant co-operable with the latch of the hand lever, a hand grip operated latch carrier and pawl operating element, an automatically releasable and engageable connection between said element and said pawl, and spring devices for urging the latch and pawl into engagement with the quadrant and disc respectively.

9. An operating means for brakes comprising an actuating disc for the brakes, spring means for biasing the disc to such position as to set the brakes, a hand lever having a pawl engageable with and disengageable from the disc for shifting and controlling the same and also having a latch, a quadrant co-operable with the latch of the hand lever, a hand grip operating latch carrier and pawl operating element, a lock casing enclosing said element, a lock mounted in the casing and having a shackle, a lateral projection constrained to partake of the movement of said element and engageable with said shackle, spring means for urging the shackle to locking position, and an automatic releasable and engageable connection between said element and said pawl.

10. An operating means for brakes including spring actuated means for setting the brakes, a handle lever having a pawl engageable with said means for controlling and shifting the same, a latch and quadrant for holding the lever in adjusted position, said pawl being engageable with the quadrant to hold the hand lever stationary when said spring means is released to set the brakes.

JAMES P. McGLYNN.
CHARLES H. GALLAGHER.